Patented July 25, 1939

2,167,132

UNITED STATES PATENT OFFICE 2,167,132

PROCESS FOR THE PREPARATION OF DERIVATIVES OF ESTRADIOL

Rezsö Weisz, Budapest, Hungary, assignor to the firm Chinoin Gyogyszer És Vegyészeti Termékek Gyara R. T. (Dr. Kereszty and Dr. Wolf), Ujpest, Hungary, a corporation of Hungary No Drawing. Application February 17, 1938, Serial No. 190,952. In Hungary February 17, 1937

7 Claims. (Cl. 260—397)

This invention relates to a process for the preparation of derivatives of estradiol in which the hydroxyl group in the position 17 is substituted.

The production of derivatives of estradiol acylated in the hydroxyl group in the position 17 is disclosed in British Patent No. 428,215. According to this prior specification acyl derivatives of estradiol are obtained by heating estradiol in the presence of hydrogen bromide or toluene sulphonic acid with the acid intended to be introduced. One obtains the diacyl derivative together with the monoacyl product acylated in the hydroxyl group in the position 17, the separation being difficult and tedious. According to another process (Helvetica Chimica Acta, 1937, page 270), the estradiol derivatives acylated in the position 17 are produced from the corresponding diacyl derivatives by partial hydrolysis.

According to this invention it has been found that derivatives of estradiol in which the hydroxyl group in the position 17 is substituted can be prepared easily without simultaneous formation of the di-substituted product, if the acyl group is introduced into an estradiol which has been previously substituted in the position 3 by benzyl or substituted benzyl group and then the benzyl, or the substituted benzyl group is split off, for example by catalytic reduction. By this process the derivatives of estradiol acylated in the hydroxyl group in the position 17 can be produced without difficulty.

As acyl radicals, e. g., aliphatic acyl radicals such as acetyl, or carbalkoxy radicals are suitable. By introducing acyl radicals of di- or polybasic acids, acid esters are obtained the salts of which are soluble in water.

The removal of the benzyl or of the substituted benzyl group can be effected after separation of the acylated benzyl derivatives. However, the introduction of the acyl radical and the splitting off of the benzyl or the substituted benzyl group can be effected in a single step.

The following examples illustrate how the process of the invention may be carried into effect:

1. 0.3 gram of estradiol-3-benzyl ether were heated with 2.5 grams of acetic anhydride for five hours at water bath temperature. After removal of the acetic acid anhydride in vacuum, the residue was taken up in ether. After washing until neutral reaction was obtained the ether was distilled off. The acetyl derivative was crystallised from methyl alcohol and melted at 105° C. For removal of the benzyl group 0.35 gram of the above product was dissolved in 50 ccs. of glacial acetic acid and hydrogenated with hydrogen, using palladium as catalyst, at room temperature. The catalyst was then removed by suction, the solution concentrated in vacuum, the residue taken up in ether, and the ether washed until a neutral reaction resulted and then distilled. The residue yielded on crystallisation from aqueous methyl alcohol, 17-acetylestradiol showing a melting point of 207–210° C.

2. 0.5 gram of estradiol-3-benzyl ether were dissolved in benzene and allowed to react with chlorocarbonic ethyl ester in the presence of pyridine. The acylated product was isolated according to the usual methods and then reduced in the presence of a palladium catalyst with hydrogen in glacial acetic solution. The resulting product was 17-carbalkoxy-estradiol having a melting point of 170° C. $/\alpha/D=+32°$. The product was easily soluble in chloroform, ether and benzene.

3. 0.2 gram of estradiol-3-benzyl ether, 5 ccs. of glacial acetic acid and 1 cc. of concentrated hydrochloric acid were heated for eight hours in a sealed glass tube. The glacial acetic acid was distilled off, the residue taken up in ether and washed until the reaction was neutral and the ethereal solution evaporated. On crystallisation from aqueous alcohol 17-acetyl-estradiol was produced; melting point: 210° C.

4. 2 grams of estradiol-3-benzyl ether and 1 gram of succinic anhydride were heated with 5 ccs. of pyridine for eight hourse at 100° C. The reaction mixture was then diluted with ether and the ethereal solution shaken several times with dilute acetic acid. Thereupon the ethereal solution was exhaustively extracted with dilute ammonia. The ammoniacal solution was acidified and extracted with chloroform. The chloroform solution was washed with water to neutrality and distilled off. The residue weighed 2.15 grams and had a melting point of 163° C. In order to remove the benzyl group it was dissolved in 250 ccs. of glacial acetic acid and catalytically hydrogenated in the presence of palladium. After removal of the catalyst the glacial acetic acid solution was distilled off in vacuum and, the residue obtained was crystallised from aqueous alcohol and then from benzene. 1 gram of estradiol-17-succinic acid ester was obtained having a melting point of 150 to 155° C. and an acid number of 146. The salts, for example the sodium salt, are suitable for the production of aqueous hormone solutions.

The products of the process of this invention are valuable hormone preparations.

The estradiol-3-benzyl ether can be produced, e. g., by benzylating estradiol by usual benzylating methods. The estradiol-3-benzyl ether if recrystallised from methanol has a M. P. of 84–85° C.

What I claim is:

1. A process for preparing estradiol derivatives which comprises acylating estradiol-3-benzylether by reacting it with an aliphatic acylating agent, and subsequently removing the benzyl group by catalytic reduction.

2. A process as claimed in claim 1 in which a carbalkoxy halogenide is used as the acylating agent.

3. As a new product of manufacture an estradiol derivative of the formula $C_{18}H_{23}O_2.A$ in which A is a monovalent acyl radical of a dibasic acid in position 17.

4. As a new product of manufacture an estradiol derivative of the formula $C_{18}H_{23}O_2.A$ in which A is a monovalent acyl radical of a polybasic acid in position 17.

5. As a new product of manufacture an estradiol derivative of the formula $$C_{18}H_{23}O_2.OC.CH_2.CH_2.COOH$$

in which the succinic group is in position 17.

6. As a new product of manufacture an estradiol derivative of the formula $C_{18}H_{23}O_2.CO.OR$, in which R is an alkyl radical and the group —CO.OR is bound to the oxygen atom in position 17.

7. As a new product of manufacture an estradiol derivative of the formula $C_{18}H_{23}O_2.CO.O.C_2H_5$, in which the group —CO.O.C$_2$H$_5$ is bound to the oxygen atom in position 17.

REZSÖ WEISZ.